350-464 SR

OR 2,830,495 06T X4092Y
X4107E X4105W
X4113N

SEARCH ROOM

T2269
X2268
X2031
X2039
X2038
X2037

April 15, 1958 F. KOCH ET AL 2,830,495

WIDE ANGLE ANASTIGMATIC OBJECTIVE COMPRISING TWO NEGATIVE MENISCUS INNER COMPONENTS ENCLOSED BY OUTER POSITIVE MENISCUS COMPONENTS

Filed Aug. 5, 1953 4 Sheets-Sheet 1

WIDE ANGLE ANASTIGMATIC OBJECTIVE COMPRISING TWO NEGATIVE MENISCUS INNER COMPONENTS ENCLOSED BY OUTER POSITIVE MENISCUS COMPONENTS

Filed Aug. 5, 1953 4 Sheets-Sheet 2

April 15, 1958 F. KOCH ET AL 2,830,495

WIDE ANGLE ANASTIGMATIC OBJECTIVE COMPRISING TWO NEGATIVE MENISCUS INNER COMPONENTS ENCLOSED BY OUTER POSITIVE MENISCUS COMPONENTS

Filed Aug. 5, 1953 4 Sheets-Sheet 3

April 15, 1958 F. KOCH ET AL 2,830,495

WIDE ANGLE ANASTIGMATIC OBJECTIVE COMPRISING TWO NEGATIVE MENISCUS INNER COMPONENTS ENCLOSED BY OUTER POSITIVE MENISCUS COMPONENTS

Filed Aug. 5, 1953 4 Sheets-Sheet 4

United States Patent Office

2,830,495

Patented Apr. 15, 1958

2,830,495

WIDE ANGLE ANASTIGMATIC OBJECTIVE COMPRISING TWO NEGATIVE MENISCUS INNER COMPONENTS ENCLOSED BY OUTER POSITIVE MENISCUS COMPONENTS

Friedrich Koch and Robert Richter, Heidenheim (Brenz), Germany, assignors to Carl Zeiss, Heidenheim (Brenz), Germany

Application August 5, 1953, Serial No. 372,472

Claims priority, application Germany August 16, 1952

4 Claims. (Cl. 88—57)

The present invention refers to anastigmatic objectives for photography and projection, in which two collective components enclose two dispersive elements, whereby all eight exterior surfaces of these four basic components of the objective turn their concave sides towards the space bounded by the inside basic components and the vertex distance of the two facing surfaces of the dispersive basic components is greater than ⅕ of the arithmetic mean of the radii of curvature of these surfaces. Such objectives have been made known through the U. S. patent specification No. 2,031,792.

In the accompanying drawings which serve for illustrating the present invention:

Figs. 1 to 4 show four well-known exemplary types of objective lens systems to which the present invention can be applied, while Figs. 5 to 9 show several exemplary embodiments of such objective lens systems in accordance with the present invention.

All these embodiments at least contain two collective and air separated therefrom two dispersive lens components the latter being enclosed by said collecting components all said components turning their concave outer surface toward the air space between said dispersive components.

Figure 1:
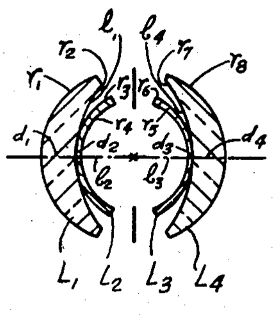
Figure 2:
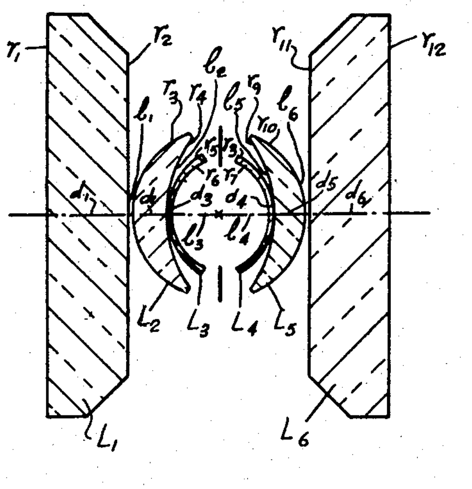
Figure 3:
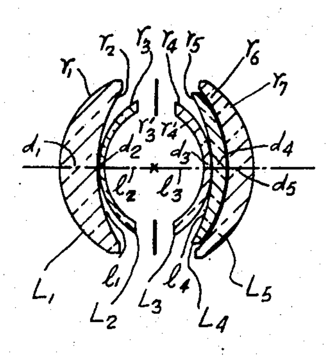
Figure 4:
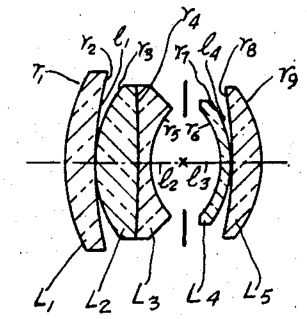

Figs. 1 and 2 of the accompanying illustrations show two execution forms from the above mentioned patent. Another objective of this kind has been made known through the American Patent 2,116,264; a performance of the same is to be seen in the accompanying illustration of Fig. 3. In this form the rear collective basic component of the above mentioned four components consists of two menisci separated by a narrow air space. The mentioned forms are suitable for a relative aperture of about 1:6.3 and an image field of about 90°.

A third form of objectives of the mentioned kind became known through a publication in the Jena Jahrbuch 1951 page 58. Such a form is suitable for a relative aperture of 1:2.8 and an image field of about 52°; a copy of an illustration of this publication is reproduced in the accompanying illustration of Fig. 4. In these figures are signified with L the individual lenses, with *r* the radii, with *d* the lens thicknesses and with *l* the air separations of the lens vertices and of the diaphragm.

The performance of suchlike objectives can be improved according to the invention thereby, that one mounts in the air space between the two dispersive basic components a correction system, composed of lenses with exclusively spherical surfaces whose refractive power is slight in comparison to the refractive power of the complete objective. In consequence of the slight refractive power of the correction system the favorable construction of the familiar basic system remains preserved, the correction system however has, mounted in accordance with the invention at a place between the two halves of the basic system, in spite of slight refractive power the strongest effect on an improvement of the astigmatic zonal errors, and, in case it is provided with lenses of suitable color dispersion, also the greatest influence on the elimination of the chromatic deviations of the image curvature.

In the further accompanying Figures 5 to 9, five execution examples of objectives in accordance with the invention are represented and their dimensions reproduced in the calculation examples specified in the following. Herein L signifies the individual lenses, *r* the radii of the lens surfaces, *d* the thicknesses, and *a* the vertex distances of the individual lenses, *b* the diaphragm position, $n_D$ the refractive indices and $v$ the dispersion values of the glasses of the individual lenses.

*1. Execution example*

Figures 5, 6:
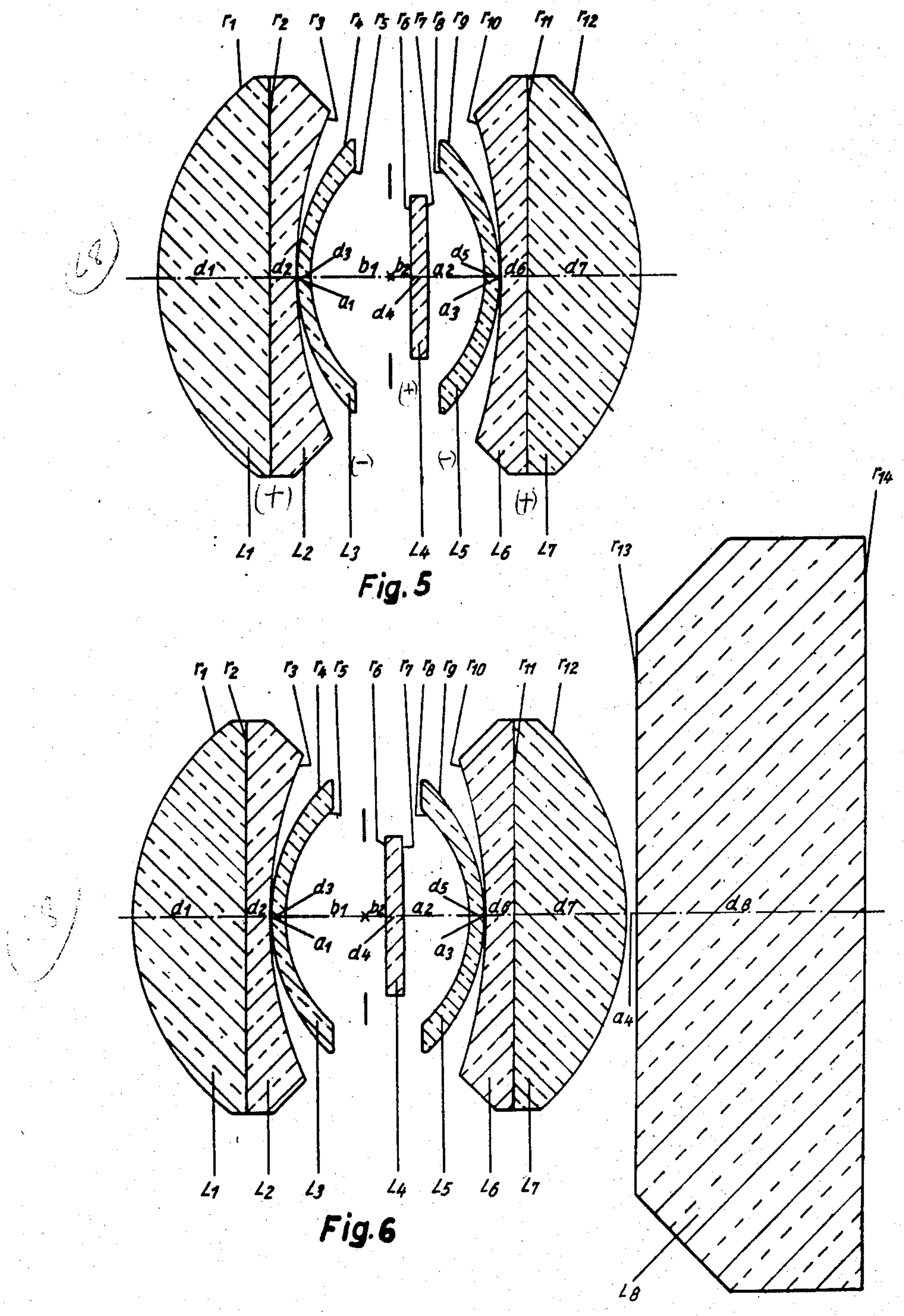

An objective with the focal length $f=98$, the relative aperture 1:4 and an image field of 63° (Fig. 5). It has the following construction data:

| | | | $n_D$ | $v$ |
|---|---|---|---|---|
| $r_1=+26.20$ | | | | |
| | $d_1=12.00$ | $L_1$ | 1.6935 | 53.5 |
| $r_2=\infty$ | | | | |
| | $d_2=2.80$ | $L_2$ | 1.7015 | 41.1 |
| $r_3=+42.00$ | | | | |
| | $a_1=0.02$ | | | |
| $r_4=+20.35$ | | | | |
| | $d_3=1.50$ | $L_3$ | 1.7282 | 28.3 |
| $r_5=+15.60$ | | | | |
| | $b_1=8.50$<br>$b_2=2.00$ | | | |
| $r_6=\infty$ | | | | |
| | $d_4=2.00$ | $L_4$ | 1.5163 | 64.0 |
| $r_7=-485.00$ | | | | |
| | $a_2=6.00$ | | | |
| $r_8=-15.60$ | | | | |
| | $d_5=1.50$ | $L_5$ | 1.7282 | 28.3 |
| $r_9=-20.35$ | | | | |
| | $a_3=0.02$ | | | |
| $r_{10}=-54.70$ | | | | |
| | $d_6=2.80$ | $L_6$ | 1.7015 | 41.1 |
| $r_{11}=\infty$ | | | | |
| | $d_7=12.00$ | $L_7$ | 1.6935 | 53.5 |
| $r_{12}=-28.40$ | | | | |

*2. Execution example*

An objective with the focal length $f=98$, the relative aperture 1:4 and an image field of 63°, in which distortion is practically completely eliminated (Fig. 6). Its construction data are the following:

| | | | $n_D$ | $v$ |
|---|---|---|---|---|
| $r_1=+26.40$ | | | | |
| | $d_1=12.00$ | $L_1$ | 1.6935 | 53.5 |
| $r_2=\infty$ | | | | |
| | $d_2=2.80$ | $L_2$ | 1.7015 | 41.1 |
| $r_3=+43.40$ | | | | |
| | $a_1=0.02$ | | | |
| $r_4=+20.35$ | | | | |
| | $d_3=1.50$ | $L_3$ | 1.7283 | 28.3 |
| $r_5=+15.60$ | | | | |
| | $b_1=8.50$<br>$b_2=2.00$ | | | |
| $r_6=\infty$ | | | | |
| | $d_4=2.00$ | $L_4$ | 1.5163 | 64.0 |
| $r_7=-485.00$ | | | | |
| | $a_2=7.00$ | | | |
| $r_8=-15.60$ | | | | |
| | $d_5=1.50$ | $L_5$ | 1.7283 | 28.3 |
| $r_9=-20.35$ | | | | |
| | $a_3=0.02$ | | | |
| $r_{10}=-52.50$ | | | | |
| | $d_6=2.80$ | $L_6$ | 1.7015 | 41.1 |
| $r_{11}=\infty$ | | | | |
| | $d_7=12.00$ | $L_7$ | 1.6935 | 53.5 |
| $r_{12}=-28.20$ | | | | |
| | $a_4=1.00$ | | | |
| $r_{13}=\infty$ | | | | |
| | $d_8=24.50$ | $L_8$ | 1.5163 | 64.0 |
| $r_{14}=\infty$ | | | | |

*3. Execution example*

Figure 7:
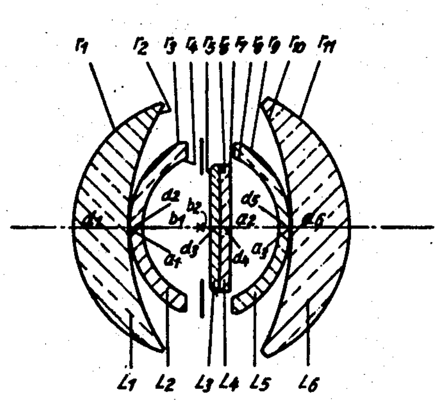

An objective with the focal length $f=101$, the relative aperture 1:6.3, and an image field of about 90° (Fig. 7). The following are the construction data:

| | | | $n_D$ | $v$ |
|---|---|---|---|---|
| $r_1=+26.40$ | | | | |
| | $d_1=11.00$ | $L_1$ | 1.6204 | 60.3 |
| $r_2=+45.00$ | | | | |
| | $a_1=0.02$ | | | |
| $r_3=+18.90$ | | | | |
| | $d_2=2.50$ | $L_2$ | 1.7847 | 25.7 |
| $r_4=+15.00$ | | | | |
| | $b_1=11.80$ <br> $b_2=1.50$ | | | |
| $r_5=\infty$ | | | | |
| | $d_3=2.00$ | $L_3$ | 1.6910 | 54.8 |
| $r_6=-200.00$ | | | | |
| | $d_4=2.00$ | $L_4$ | 1.7283 | 28.3 |
| $r_7=-4500.00$ | | | | |
| | $a_2=9.30$ | | | |
| $r_8=-15.00$ | | | | |
| | $d_5=2.50$ | $L_5$ | 1.7283 | 28.3 |
| $r_9=-18.90$ | | | | |
| | $a_3=0.02$ | | | |
| $r_{10}=-53.45$ | | | | |
| | $d_6=11.00$ | $L_6$ | 1.6910 | 54.8 |
| $r_{11}=-28.60$ | | | | |

*4. Execution example*

Figure 8:
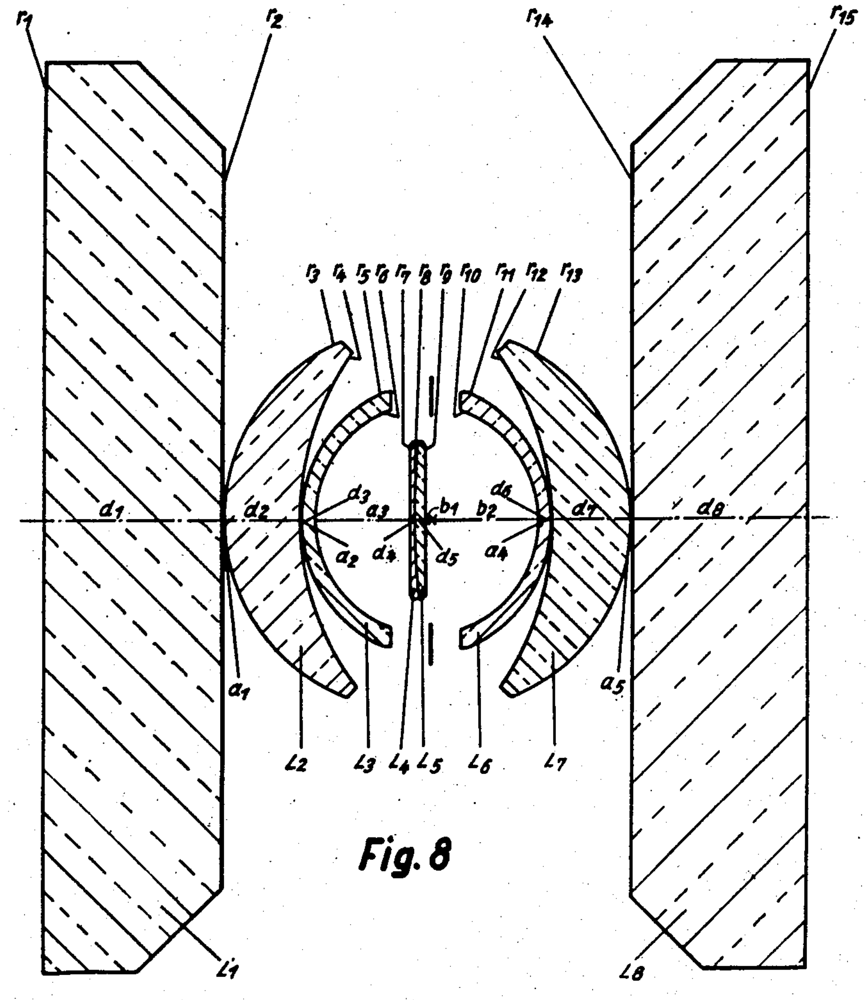

An objective with the focal length $f=182$, the relative aperture of 1:6.3, and an image field of about 90° (Fig. 8). The distortion is likewise very completely eliminated. This objective is suitable for image formations at most varied scales. The construction data are as follows:

| | | | $n_D$ | $v$ |
|---|---|---|---|---|
| $r_1=\infty$ | | | | |
| | $d_1=35.70$ | $L_1$ | 1.7847 | 25.7 |
| $r_2=\infty$ | | | | |
| | $a_1=0.10$ | | | |
| $r_3=+37.584$ | | | | |
| | $d_2=15.05$ | $L_2$ | 1.6209 | 60.2 |
| $r_4=+56.234$ | | | | |
| | $a_2=0.05$ | | | |
| $r_5=+27.384$ | | | | |
| | $d_3=2.55$ | $L_3$ | 1.7171 | 29.5 |
| $r_6=+22.549$ | | | | |
| | $a_3=18.5$ | | | |
| $r_7=\infty$ | | | | |
| | $d_4=1.00$ | $L_4$ | 1.6200 | 36.3 |
| $r_8=+158.49$ | | | | |
| | $d_5=2.00$ | $L_5$ | 1.6204 | 60.3 |
| $r_9=\infty$ | | | | |
| | $b_1=1.00$ <br> $b_2=21.00$ | | | |
| $r_{10}=-22.549$ | | | | |
| | $d_6=2.55$ | $L_6$ | 1.7171 | 29.5 |
| $r_{11}=-27.384$ | | | | |
| | $a_4=0.05$ | | | |
| $r_{12}=-56.234$ | | | | |
| | $d_7=15.05$ | $L_7$ | 1.6209 | 60.2 |
| $r_{13}=-37.584$ | | | | |
| | $a_5=0.10$ | | | |
| $r_{14}=\infty$ | | | | |
| | $d_8=34.90$ | $L_8$ | 1.6195 | 36.4 |
| $r_{15}=\infty$ | | | | |

*5. Execution example*

Figure 9:
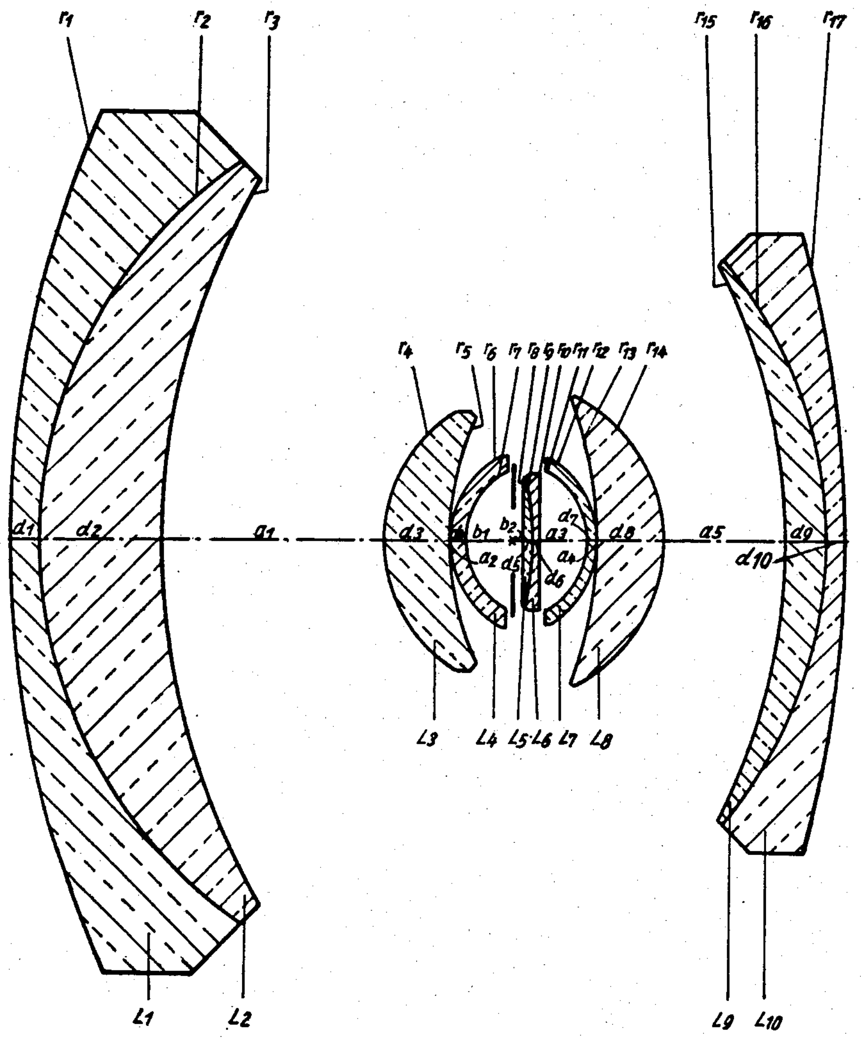

An objective with the focal length $f=99$, the relative aperture 1:5.6, and an image field of about 90° is represented in Fig. 9. In this objective the four basic elements are enclosed by two dispersive elements in the interest of a more favorable light distribution over the entire image field. The construction data are as follows:

| | | | $n_D$ | $v$ |
|---|---|---|---|---|
| $r_1=+210.00$ | | | | |
| | $d_1=6.00$ | $L_1$ | 1.7234 | 38.0 |
| $r_2=+91.20$ | | | | |
| | $d_2=24.00$ | $L_2$ | 1.5014 | 56.5 |
| $r_3=+142.44$ | | | | |
| | $a_1=44.16$ | | | |
| $r_4=+30.24$ | | | | |
| | $d_3=13.20$ | $L_3$ | 1.6910 | 54.8 |
| $r_5=+58.80$ | | | | |
| | $a_2=0.02$ | | | |
| $r_6=+19.14$ | | | | |
| | $d_4=3.00$ | $L_4$ | 1.7847 | 25.7 |
| $r_7=+15.60$ | | | | |
| | $b_1=9.12$ <br> $b_2=2.40$ | | | |
| $r_8=\infty$ | | | | |
| | $d_5=1.80$ | $L_5$ | 1.6910 | 54.8 |
| $r_9=-60.00$ | | | | |
| | $d_6=1.80$ | $L_6$ | 1.7283 | 28.3 |
| $r_{10}=+6000.0$ | | | | |
| | $a_3=9.42$ | | | |
| $r_{11}=-15.60$ | | | | |
| | $d_7=1.80$ | $L_7$ | 1.7847 | 25.7 |
| $r_{12}=-19.14$ | | | | |
| | $a_4=0.02$ | | | |
| $r_{13}=-80.40$ | | | | |
| | $d_8=13.20$ | $L_8$ | 1.7200 | 50.3 |
| $r_{14}=-32.40$ | | | | |
| | $a_5=24.00$ | | | |
| $r_{15}=-120.00$ | | | | |
| | $d_9=8.40$ | $L_9$ | 1.5038 | 66.7 |
| $r_{16}=-86.40$ | | | | |
| | $d_{10}=3.60$ | $L_{10}$ | 1.6727 | 32.2 |
| $r_{17}=-226.20$ | | | | |

We claim:

1. A wide angle anastigmatic objective for aerial photography and projection purposes of the basic form containing at least two negative meniscus inner components concave toward each other and enclosing a central inner air space and a diaphragm therein, and two positive meniscus outer components concave toward the negative components and all axially aligned and airspaced apart, said four elements being corrected especially for spherical aberration characterized by the said inner central air space being greater than 80% and smaller than 200% of the arithmetic mean of the radii of curvature of the inner concave surfaces of said negative components bounding said air space, and by a subsantially afocal correcting component located substantially at the diaphragm position for correcting for residual astigmatic zonal abberation of the objective, said component having merely spherical outer surfaces the radii of which lying between $-1.5 \cdot f$ and $+1.5 \cdot f$ including plane surfaces, and the mean refractive index of said correcting component in combination with said radii being such that its refractive power lies between $-0.2/f$ and $+0.2/f$ including zero power, $f$ being the focal length and $1/f$ the focal power of the objective.

2. A wide angle anastigmatic objective according to claim 1, with said afocal correcting component having substantially plane parallel outer surfaces and including a glass having a color dispersion index smaller than 30.

3. A wide angle anastigmatic objective according to claim 1, with said afocal correcting component consisting of a lens of dispersive power and another lens of converging power cemented to it, all surfaces of said correcting component being spherical surfaces for correcting for residual astigmatic zonal aberration and chromatic aberration of the image field, the refractive index of said dispersive lens in said correcting component being substantially equal to or greater than that of the converging lens by at maximum 0.10, and its color dispersive index being between 40% and 70% of that of the converging lens, said cemented surface in said correcting component having values between $0.3 \cdot f$ and $3 \cdot f$, $f$ being the focal length of the objective.

4. A wide angle anastigmatic objective according to claim 1, two further dispersive meniscus components located as outermost components each one with an air separation between the adjacent positive meniscus component of between 0.2·*f* and 0.8·*f* and consisting each of a dispersive meniscus element and a converging meniscus element cemented together and turning all their concave surfaces toward the diaphragm space, the radii of the outer convex surfaces bounding on air lying between 1.0·*f* and 2.5·*f* and the radii of the inner concave surfaces bounding on air lying between 0.45·*f* and 1.5·*f* being the focal length of the objective, and the refractive index of each dispersive meniscus element in said outermost components being greater than that of the respective converging meniscus element cemented to it by between 0.05 and 0.25 and its color dispersive index being between 40% and 80% of that of the respective converging meniscus element.

References Cited in the file of this patent

UNITED STATES PATENTS

| | | |
|---|---|---|
| 2,031,792 | Richter | Feb. 25, 1936 |
| 2,116,264 | Hasselkus et al. | May 3, 1938 |
| 2,325,275 | Rayton | July 27, 1943 |
| 2,383,115 | Durrand | Aug. 21, 1945 |
| 2,430,150 | Warmisham | Nov. 4, 1947 |
| 2,518,719 | Reiss | Aug. 15, 1950 |
| 2,559,875 | Herzberger | July 10, 1951 |
| 2,596,799 | Tiller et al. | May 13, 1952 |

FOREIGN PATENTS

| | | |
|---|---|---|
| 656,011 | Great Britain | Aug. 8, 1951 |
| 689,916 | Great Britain | Apr. 18, 1953 |